United States Patent
Ohgushi et al.

(10) Patent No.: US 8,810,184 B2
(45) Date of Patent: Aug. 19, 2014

(54) MOTOR DRIVING CIRCUIT AND MOTOR DRIVING SYSTEM

(75) Inventors: Toshiaki Ohgushi, Yokohama (JP); Takehiro Hara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 71 days.

(21) Appl. No.: 13/370,887

(22) Filed: Feb. 10, 2012

(65) Prior Publication Data

US 2013/0147413 A1 Jun. 13, 2013

(30) Foreign Application Priority Data

Dec. 7, 2011 (JP) ................................. 2011-268064

(51) Int. Cl.
*G05B 19/41* (2006.01)

(52) U.S. Cl.
USPC ........................ 318/568.15; 318/599; 318/573

(58) Field of Classification Search
USPC ........ 318/568.15, 599, 254, 138, 439; 360/75
See application file for complete search history.

(56) References Cited

U.S. PATENT DOCUMENTS

2005/0057200 A1 3/2005 Akiyama
2011/0166750 A1 7/2011 Nakano

FOREIGN PATENT DOCUMENTS

| JP | 2002153084 A | * | 5/2002 |
| JP | 2004215362 A | * | 7/2004 |
| JP | 2005-94857 | | 4/2005 |
| JP | 2010-64622 | | 3/2010 |

* cited by examiner

*Primary Examiner* — Eduardo Colon Santana
*Assistant Examiner* — Bickey Dhakal
(74) *Attorney, Agent, or Firm* — Oblon, Spivak, McClelland, Maier & Neustadt, L.L.P.

(57) ABSTRACT

The characteristic is defined by a characteristic line that connects a lowest point at which the duty of the PWM signal is a minimum value and the rotation command signal is a minimum rotation command signal, and a highest point at which the duty of the PWM signal is a maximum value and the rotation command signal is a maximum rotation command signal. The duty calculating circuit updates the characteristic so that the characteristic line passes through a first control point at which the duty of the PWM signal is a value set based on the first setting signal and the rotation command signal is a first rotation command signal between the minimum rotation command signal and the maximum rotation command signal.

18 Claims, 12 Drawing Sheets

MOTOR DRIVING CIRCUIT AND MOTOR DRIVING SYSTEM

CROSS-REFERENCE TO RELATED APPLICATION

This application is based upon and claims the benefit of priority from the prior Japanese Patent Application No. 2011-268064, filed on Dec. 7, 2011, the entire contents of which are incorporated herein by reference.

BACKGROUND

1. Field

Embodiments described herein relate generally to a motor driving circuit and a motor driving system.

2. Background Art

A conventional motor driving system includes a motor driving circuit, a motor, and a rotating load.

The motor driving system controls the number of revolutions of the motor with a number-of-revolutions controlling signal input to the motor driving circuit. Although the number-of-revolutions controlling signal may be a signal indicative of the pulse duty, the pulse frequency or the analog voltage, the following description will be focused on a case where the number-of-revolutions controlling signal is a signal indicative of the analog voltage.

The motor driving circuit measures the voltage of a circuit command signal, calculates the on-duty of the PWM output based on the measurement, and outputs a motor driving waveform. The motor driving circuit linearly increases the duty in proportion to the measured voltage.

DETAILED DESCRIPTION

A motor driving circuit controls driving of a motor with a PWM signal so that the motor rotates at a number of revolutions specified by a rotation command signal, the motor driving circuit according to an embodiment. The motor driving circuit has a first port to which the rotation command signal that defines the number of revolutions of the motor is input. The motor driving circuit has a first measuring circuit that measures the rotation command signal. The motor driving circuit has a second port to which a first setting signal is input. The motor driving circuit has a second measuring circuit that measures the first setting signal. The motor driving circuit has a duty calculating circuit that calculates a duty corresponding to the measured rotation command signal based on a characteristic that defines a relationship between the rotation command signal and a duty of the PWM signal, and outputs a duty information signal corresponding to the calculated duty. The motor driving circuit has a motor driving waveform controlling circuit that generates and outputs the PWM signal having the calculated duty based on the duty information signal.

The characteristic is defined by a characteristic line that connects a lowest point at which the duty of the PWM signal is a minimum value and the rotation command signal is a minimum rotation command signal, and a highest point at which the duty of the PWM signal is a maximum value and the rotation command signal is a maximum rotation command signal.

The duty calculating circuit updates the characteristic so that the characteristic line passes through a first control point at which the duty of the PWM signal is a value set based on the first setting signal and the rotation command signal is a first rotation command signal between the minimum rotation command signal and the maximum rotation command signal.

As described above, although a rotation command signal may be a signal indicative of a pulse duty, a pulse frequency or an analog voltage, the following description will be focused on a case where the rotation command signal is a signal indicative of the analog voltage (rotation command voltage).

Figure 1:
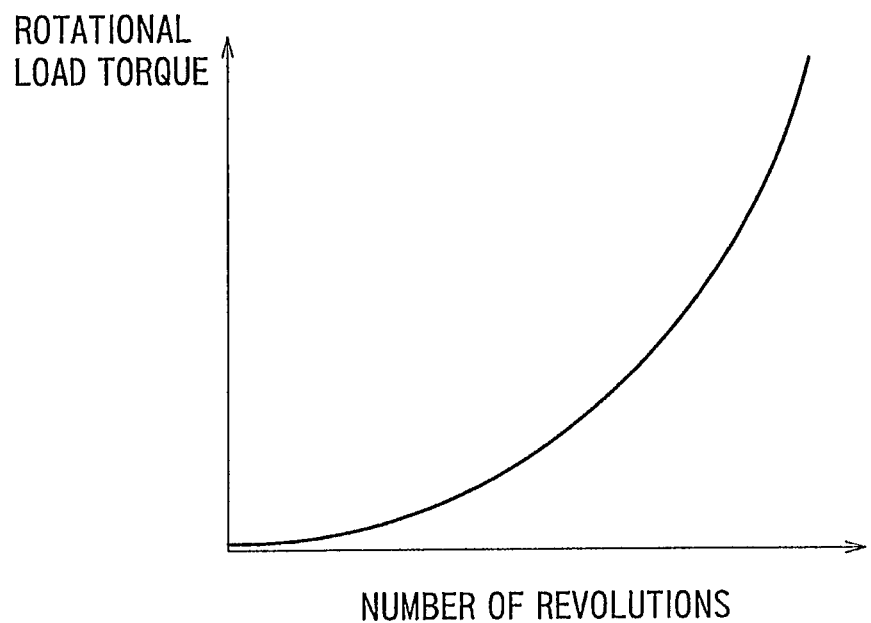
FIG. 1 is a graph showing a relationship between the rotational load torque and the number of revolutions of a motor.
Figure 2:
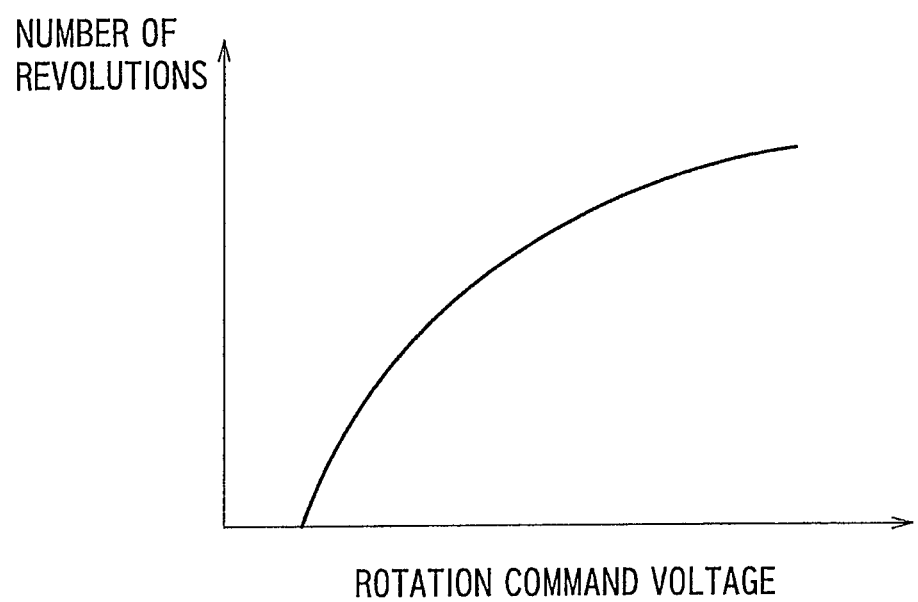
FIG. 2 is a graph showing a relationship between the number of revolutions of a motor and the rotation command voltage according to a comparative example.

FIG. 1 is a graph showing a relationship between the rotational load torque and the number of revolutions of a motor. FIG. 2 is a graph showing a relationship between the number of revolutions of a motor and the rotation command voltage according to a comparative example.

For example, in the case where a rotational load in the form of a fan or the like is attached to a rotating shaft of the motor, the relationship between the rotational load torque and the number of revolutions is not linear but is quadratic as shown in FIG. 1, for example.

As a result, as shown in FIG. 2, the relationship between the rotation command voltage, which is an analog value, and the number of revolutions of the motor is also not linear. Therefore, in the vicinity of the maximum number of revolutions, the number of revolutions is almost fixed even if the rotation command voltage increases, so that the number of revolutions is hard to control with the rotation command voltage.

Figure 3:
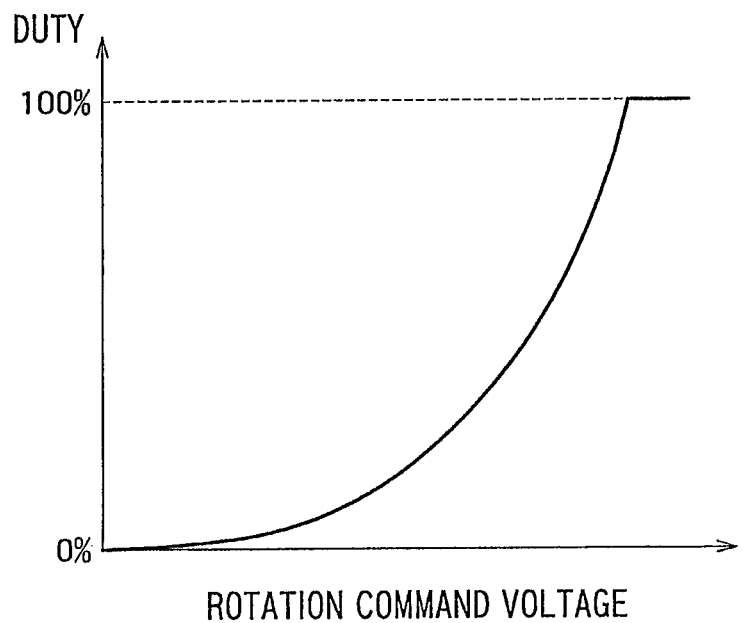
FIG. 3 is a graph showing a relationship between the rotation command voltage and a PWM on-duty in the case where the PWM on-duty quadratically increases with the rotation command voltage.
Figure 4:
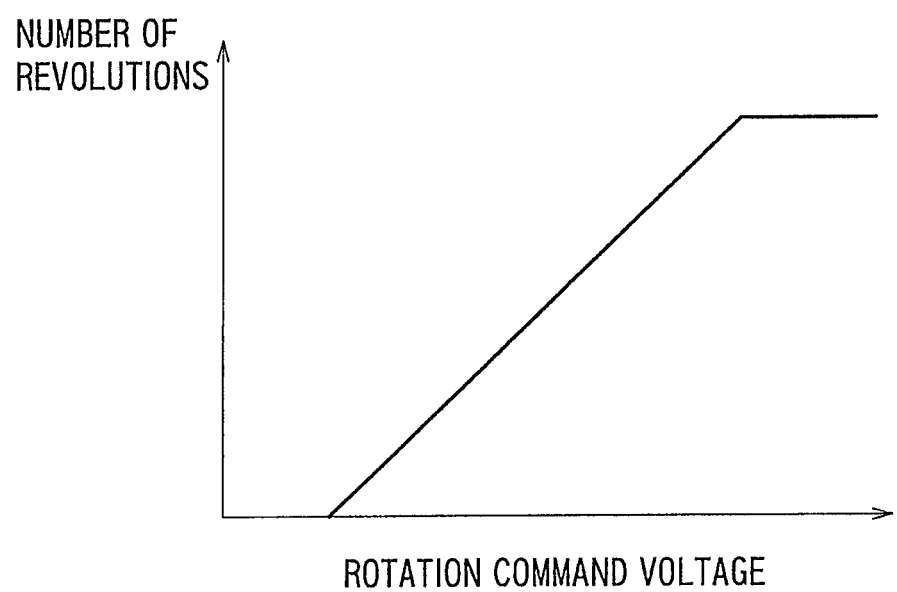
FIG. 4 is a graph showing a relationship between the number of revolutions of the motor and the rotation command voltage in the case where the relationship between the PWM output on-duty and the rotation command voltage shown in FIG. 3 is applied.

FIG. 3 is a graph showing a relationship between the rotation command voltage and a PWM on-duty in the case where the PWM on-duty quadratically increases with the rotation command voltage. FIG. 4 is a graph showing a relationship between the number of revolutions of the motor and the rotation command voltage in the case where the relationship between the PWM output on-duty and the rotation command voltage shown in FIG. 3 is applied.

If the PWM on-duty quadratically increases with the rotation command voltage in a predetermined range (a range of the on-duty from 0% to 100%) as shown in FIG. 3, the relationship between the rotation command voltage, which is an analog value, and the number of revolutions of the motor is linear as shown in FIG. 4.

As a result, in the vicinity of the maximum number of revolutions, the number of revolutions varies with the rotation command voltage, and therefore can be more easily controlled.

In the embodiments described below, the relationships shown in FIGS. 3 and 4 are applied, thereby providing a motor driving circuit and a motor driving system that are improved in controllability of the number of revolutions of the motor.

In the following, each embodiment will be described with reference to the drawings. The embodiments described below concern cases where the present invention is applied to control of a three-phase motor whose number of revolutions is controlled by a three-phase driving voltage.

However, the present invention can be equally applied to other types of motor whose number of revolutions is controlled by a driving voltage.

First Embodiment

Figure 5:
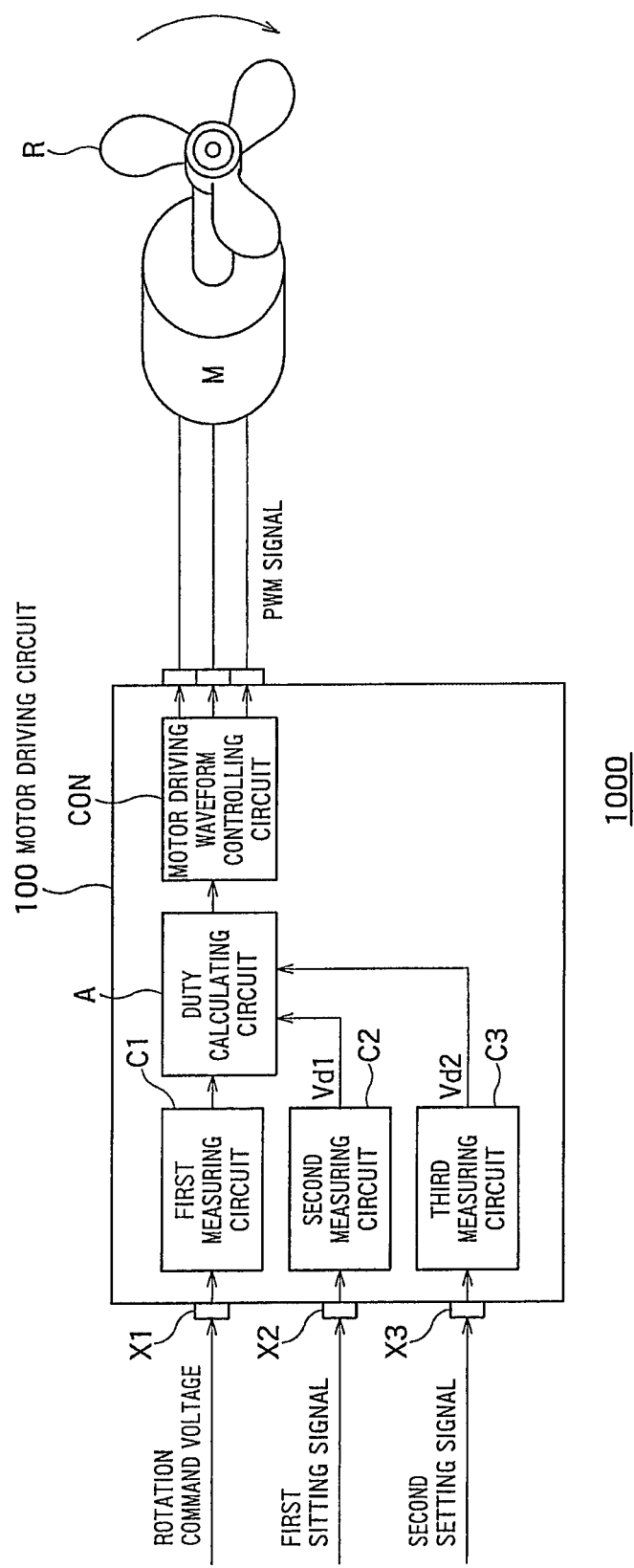
FIG. 5 is a diagram showing an example of a configuration of a motor driving system 1000 according to a first embodiment.
Figure 6:
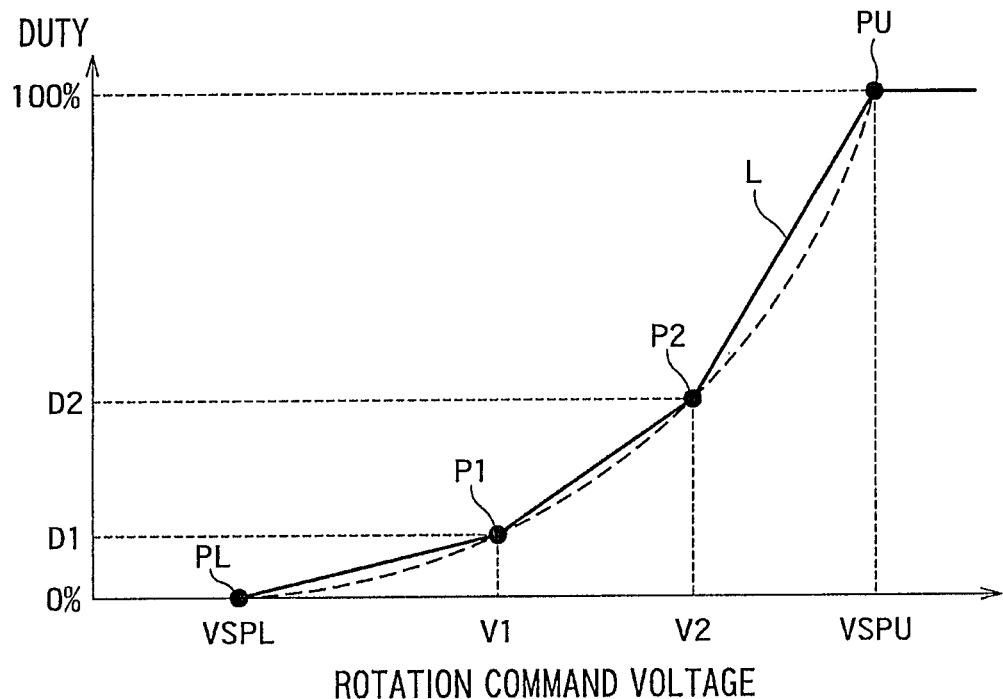
FIG. 6 is a graph showing characteristics according to the first embodiment indicated by a characteristic line showing a relationship between the rotation command voltage (rotation command signal) and the duty.

FIG. 5 is a diagram showing an example of a configuration of a motor driving system 1000 according to a first embodiment. FIG. 6 is a graph showing characteristics according to the first embodiment indicated by a characteristic line showing a relationship between the rotation command voltage (rotation command signal) and the duty.

As shown in FIG. 5, the motor driving system 1000 includes a motor driving circuit 100 and a motor M.

The motor driving system 1000 is used for driving a cooling fan of a personal computer or a server, for example.

In this embodiment, the motor M is a three-phase motor. The motor M is driven by a three-phase driving voltage producing currents flowing through coils of the three phases. As described above, the motor M may be other types of motor whose number of revolutions is controlled by a driving voltage.

The motor driving waveform controlling circuit includes a motor driver (not shown) that applies a power supply voltage as a three-phase driving voltage to the motor M. The motor M is controlled by the three-phase driving voltage as a PWM signal output from the motor driving circuit 100.

The motor driving circuit 100 controls driving of the motor M by controlling the motor driver (or controlling the three-phase driving voltage (or driving current) to the motor M) with the PWM signal so that the motor M rotates at the number of revolutions defined by the rotation command voltage input from an external micro control unit (MCU) (not shown).

As shown in FIG. 5, the motor driving circuit 100 includes a first port X1, a second port X2, a third port X3, a first measuring circuit C1, a second measuring circuit C2, a third measuring circuit C3, a duty calculating circuit A and a motor driving waveform controlling circuit CON.

The first port X1 is configured to receive the rotation command voltage that defines the number of revolutions of the motor M input from the MCU or a resistance voltage dividing circuit, for example.

The second port X2 is configured to receive a first setting signal input from the MCU or the resistance voltage dividing circuit, for example.

The third port X3 is configured to receive a second setting signal input from the MCU or the resistance voltage dividing circuit, for example.

The first measuring circuit C1 is configured to measure the rotation command voltage input to the first port X1. The first measuring circuit C1 outputs a signal including information on the measured rotation command voltage to the duty calculating circuit A.

The second measuring circuit C2 is configured to measure the first setting signal input to the second port X2. Note that the first setting signal is an analog voltage (voltage Vd1) in this example.

The second measuring circuit C2 outputs a signal including information on the measured voltage Vd2 to the duty calculating circuit A.

The third measuring circuit C3 is configured to measure the second setting signal input to the third port X3. Note that the second setting signal is an analog voltage (voltage Vd2) in this example.

The third measuring circuit C3 outputs a signal including information on the measured voltage Vd2 to the duty calculating circuit A.

The duty calculating circuit A is configured to calculate the duty for the rotation command voltage measured by the first measuring circuit C1 based on the characteristics that defines the relationship between the rotation command voltage and the duty of the PWM signal (PWM on-duty). The duty calculating circuit A is also configured to output a duty information signal corresponding to the calculated duty (PWM on-duty).

As shown in FIG. 6, the characteristics is defined by a characteristic line L that connects the lowest point PL at which the duty of the PWM signal is the minimum value (0% in this example) and the rotation command voltage is the minimum rotation command voltage (minimum rotation command signal) VSPL, and the highest point PU at which the duty of the PWM signal is the maximum value (100% in this example) and the rotation command voltage is the maximum rotation command voltage (maximum rotation command signal) VSPU.

As shown in FIG. 6, the characteristic line L shows a monotonically increasing function that defines the relationship between the rotation command voltage and the duty of the PWM signal, for example.

In addition, as shown in FIG. 6, at a first control point P1 at which the characteristic line L is controlled, the duty of the PWM signal is a value D1 set based on the first setting signal, and the rotation command voltage is a first rotation command voltage (first rotation command signal) V1 between the minimum rotation command voltage VSPL and the maximum rotation command voltage VSPU.

In addition, as shown in FIG. 6, at a second control point P2 at which the characteristic line L is controlled, the duty of the PWM signal is a value D2 set based on the second setting signal, and the rotation command voltage is a second rotation command voltage (second rotation command signal) V2 between the minimum rotation command voltage VSPL and the maximum rotation command voltage VSPU.

In the example shown in FIG. 6, the duty value D2 is larger than the duty value D1.

In the example shown in FIG. 6, the second rotation command voltage V2 is higher than the first rotation command voltage V1.

The duty calculating circuit A is configured to update the characteristics so that the characteristic line L passes through the first control point P1 and the second control point P2.

For example, the duty calculating circuit A performs linear interpolation or curve interpolation including Lagrange interpolation, spline interpolation or Bezier interpolation so that the characteristic line L passes through the lowest point PL, the first control point P1, the second control point P2 and the highest point PU.

The motor driving waveform controlling circuit CON is configured to generate and output a PWM signal having the duty calculated by the duty calculating circuit A, based on the duty information signal output from the duty calculating circuit A. With the PWM signal, as described above, the three-phase driving voltage (or driving current) to the motor M is controlled, thereby controlling the motor M.

Next, an example of an operation of the motor driving circuit 100 having the configuration and function described above will be described.

First, the second and third measuring circuits C2 and C3 measure the first and second setting signals input to the second and third ports X2 and X3.

Then, information on the voltages Vd1 and Vd2 measured by the second and third measuring circuits C2 and C3 are transferred to the duty calculating circuit A.

The duty calculating circuit A calculates the duty D1 at the time when the rotation command voltage is V1 based on the voltage Vd1 (or determines the control point P1), and calculates the duty D2 at the time when the rotation command voltage is V2 based on the voltage Vd2 (or determines the control point P2).

For example, according to the following relations (1) and (2), the duty values D1 and D2 are calculated from the control point command voltages Vd1 and Vd2. In the relations (1) and (2), a denotes a factor of proportionality, and p denotes an offset.

$$D1 = \alpha * Vd1 + \beta \quad (1)$$

$$D2 = \alpha * Vd2 + \beta \quad (2)$$

Figure 7:
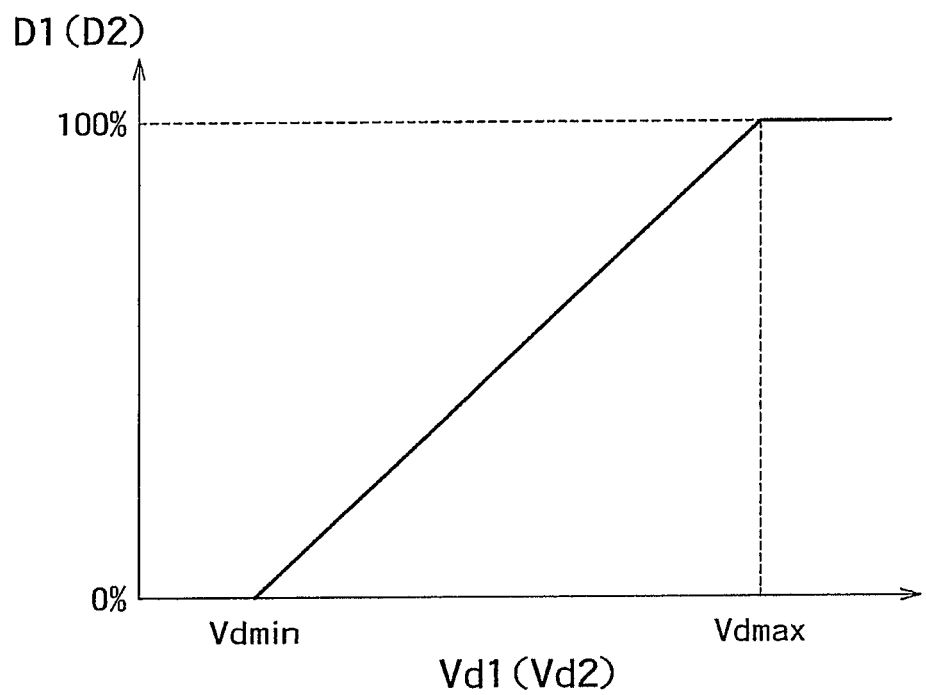
FIG. 7 is a graph showing an example of a relationship between the measured voltage Vd1 (Vd2) of the first (second) setting signal and the duty value D1 (D2)

FIG. 7 is a graph showing an example of a relationship between the measured voltage Vd1 (Vd2) of the first (second) setting signal and the duty value D1 (D2).

As shown in FIG. 7, the value D1 (D2) is set to be 100% when the voltage Vd1 (Vd2) is the upper limit value Vdmax, and to be 0% when the voltage Vd1 (Vd2) is the lower limit value Vdmin.

If the voltage Vd2 (Vd2) is equal to or higher than the upper limit value Vdmax, the value D1 (D2) is set at 100%, whereas if the voltage Vd1 (Vd2) is equal to or lower than the lower limit value Vdmin, the value D1 (D2) is set at 0%.

The first and second rotation command voltages V1 and V2 are predetermined values, which equally divide the difference between the voltages VSPL and VSPU, for example.

The duty calculating circuit A performs interpolation between the lowest point PL, the first control point P1, the second control point P2 and the highest point PU. For example, the duty calculating circuit A performs linear interpolation or curve interpolation including Lagrange interpolation, spline interpolation or Bezier interpolation so that the characteristic line L passes through the lowest point PL, the first control point P1, the second control point P2 and the highest point PU.

In this way, the duty calculating circuit A updates the characteristics so that the characteristic line L passes through the first control point P1 and the second control point P2.

As described above, a user can update the characteristics that defines the relationship between the rotation command voltage and the duty of the PWM signal (PWM on-duty) by adjusting the first and second control points P1 and P2 with the first and second setting signals so that the relationship between the rotation command voltage and the number of revolutions is linear as shown in FIG. 4 described above.

Therefore, the relationship between the rotation command voltage, which is an analog value, and the number of revolutions of the motor is linear as shown in FIG. 4, and thus, the controllability of the number of revolutions of the motor is improved.

As described above, the motor driving circuit 100 according to the first embodiment is improved in controllability of the number of revolutions of the motor.

In this embodiment, a case where there are two control points has been described.

However, even if there is only one control point, the characteristic line can be modified to update the characteristics.

Alternatively, three or more control points may be provided so that the characteristic line can be more precisely modified to update the characteristics so as to meet specific user needs.

(Modification)

Figure 8:
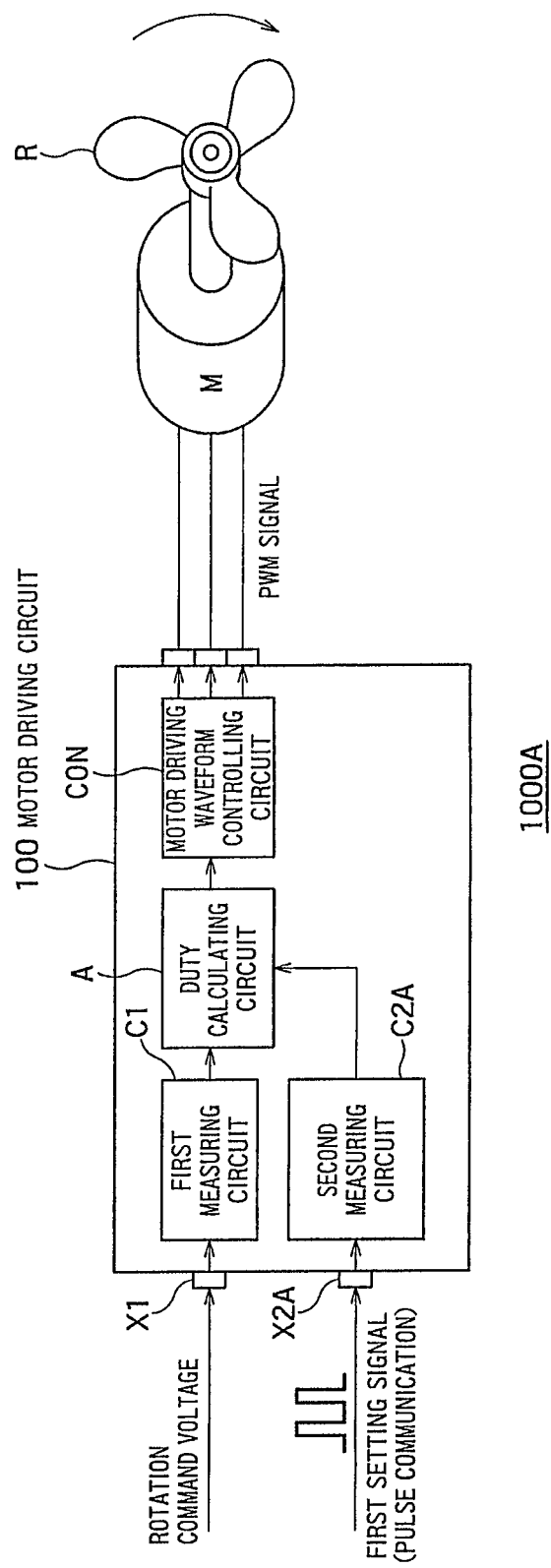
FIG. 8 is a diagram showing an example of a configuration of a motor driving system 1000A according to a modification.

FIG. 8 is a diagram showing an example of a configuration of a motor driving system 1000A according to a modification. In FIG. 8, the same reference numerals as those in FIG. 1 denote the same components as those in the first embodiment.

As shown in FIG. 8, a pulse communication signal can be used as the first and second setting signals, so that a plurality of commands can be used with a reduced number of ports.

A second measuring circuit C2A measures the setting signal input at a second port X2A, and outputs information used for setting the duty values D1 and D2 to the duty calculating circuit A. Based on the information, the duty calculating circuit A sets the first and second control points P1 and P2. That is, the duty calculating circuit A updates the characteristics so that the characteristic line L passes through the first control point P1 and the second control point P2, as in the first embodiment.

The pulse-based communication may be I2C communication, UART communication, SPI communication, three-wire serial communication or pulse duty communication.

The modification can also be applied to the embodiments described below.

Second Embodiment

In general, the rotational load has characteristics that it monotonically increases, so that the relationship between the duty and the rotation command voltage can also be a monotonically increasing relationship. However, in some cases, the relationship between the duty and the rotation command voltage is known, and the control point command does not need any adjustment.

Thus, in a second embodiment, there will be described a case where, depending on the magnitude relationship between the voltages Vd1 and Vd2, the operation mode is switched between an adjustment mode in which the control point is adjusted as in the first embodiment and a preset mode in which previously stored characteristics is set.

The motor driving system to which the second embodiment is applied is the same as the motor driving system 1000 according to the first embodiment. Therefore, the configuration thereof will be described with reference to the configuration according to the first embodiment shown in FIG. 5. In addition, in this embodiment, the first and second setting signals are analog voltages.

Figure 9:
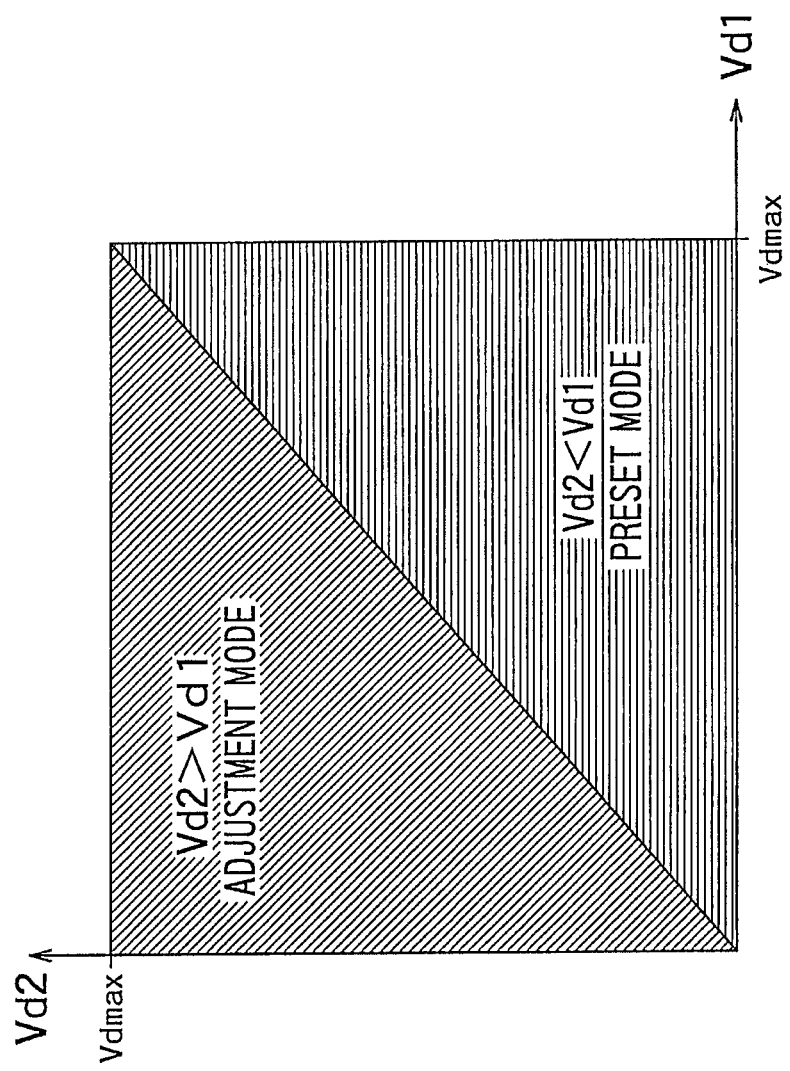
FIG. 9 is a graph showing an example of a relationship between the magnitude relationship between the voltages Vd1 and Vd2 and the operation mode of the duty calculating circuit.
Figure 10:
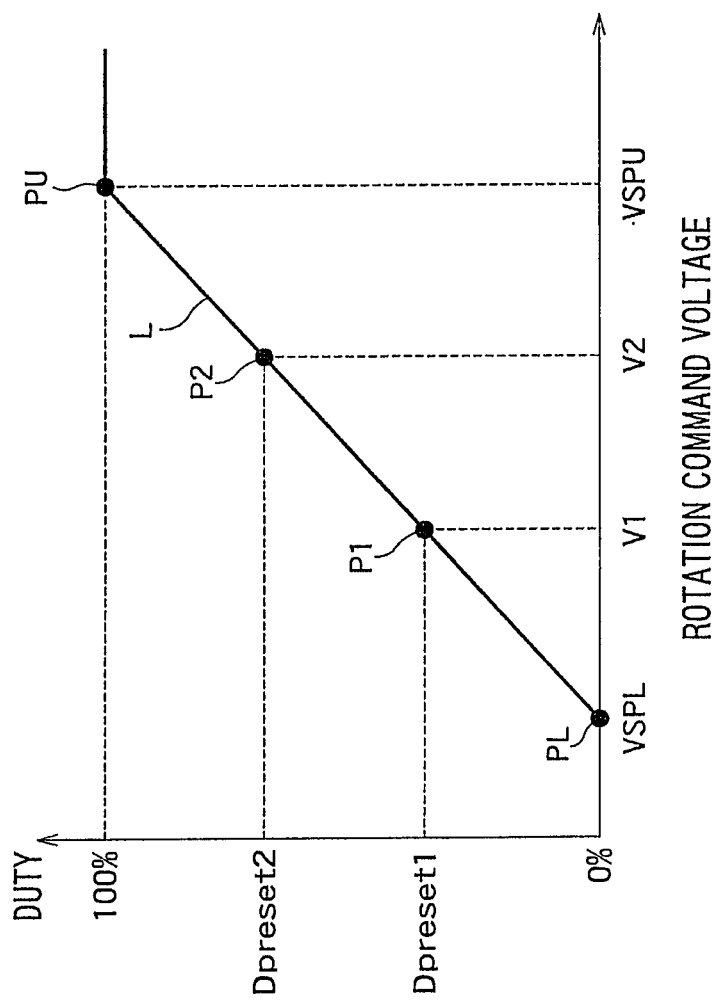
FIG. 10 is a graph showing an example of characteristics of the relationship between the rotation command voltage and the duty in the preset mode according to the second embodiment defined by a characteristic line.
Figure 11:
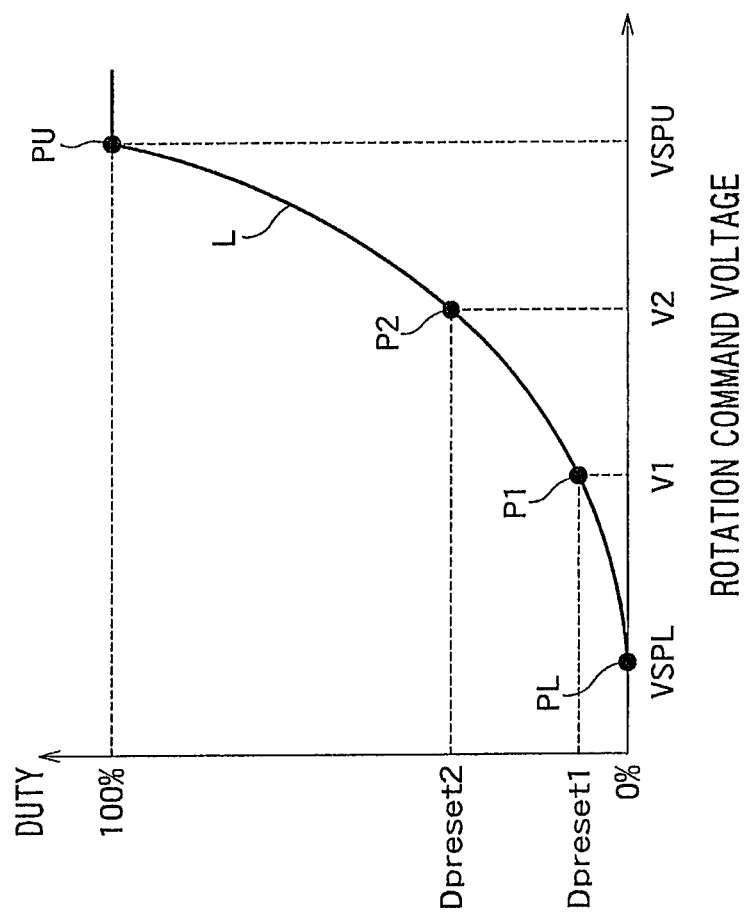
FIG. 11 is a graph showing another example of characteristics of the relationship between the rotation command voltage and the duty in the preset mode according to the second embodiment defined by a characteristic line.

FIG. 9 is a graph showing an example of a relationship between the magnitude relationship between the voltages Vd1 and Vd2 and the operation mode of the duty calculating circuit. FIG. 10 is a graph showing an example of characteristics of the relationship between the rotation command voltage and the duty in the preset mode according to the second embodiment defined by a characteristic line. FIG. 11 is a graph showing another example of characteristics of the relationship between the rotation command voltage and the duty in the preset mode according to the second embodiment defined by a characteristic line.

For example, in the case where the voltage Vd2 of the second setting signal is higher than the voltage Vd2 of the first setting signal (Vd2>Vd1), the duty calculating circuit A updates the characteristics so that the characteristic line L passes through the first control point P1 and the second control point P2 as in the first embodiment (adjustment mode).

On the other hand, in the case where the voltage of the second setting signal is equal to or lower than the voltage of the first setting signal (Vd2≤Vd1), the duty calculating circuit A sets the characteristics to be the previously stored characteristics (preset mode).

For example, the duty calculating circuit A sets the values D1 and D2 at previously stored preset values Dpreset1 and Dpreset2.

For example, the preset values Dpreset1 and Dpreset2 are set so that the relationship between the rotation command voltage and the duty is linear as shown in FIG. 10.

The preset values are used in determining the relationship between the rotation command voltage and the number of revolutions shown in FIG. 2 described above as a preparation for adjustment of the rotation command and the duty characteristics.

When the voltages Vd1 and Vd2 are set to be equal to each other (Vd2=Vd1), the adjustment mode and the preset mode may alternately occur if the voltages Vd1 and Vd2 vary because of noise. To avoid this, a mode switching margin γ may be provided, and the operation mode is set to be the adjustment mode when Vd2+γ>Vd1, the preset mode when Vd2−γ<Vd1, and a characteristics maintaining (update stop) mode when Vd1−γ<Vd2<Vd+γ.

Alternatively, the preset values Dpreset1 and Dpreset2 may be selected to approximate to rotational load compensation characteristics as shown in FIG. 11.

Note that the values Dpreset1 and Dpreset2 are preset values of the control points stored in the motor driving circuit 100 and are independent of the voltages Vd1 and Vd2.

Thus, for example, the preset values can be set by setting the second port X2 at a "High" level and the third port X3 at a "Low" level.

Therefore, for example, if the rotational load compensation characteristics are investigated at a prototyping stage, and the preset mode is used in volume production, the voltage dividing resistors can be omitted, and thus the cost can be reduced.

Furthermore, in the case where there are three or more control points, a plurality of preset values can be set according to relationships between the rotation command voltages except for the monotonically increasing relationship (Vdn>...>Vd2>Vd1).

For example, in the case where Vd2<Vd1<Vd3, the value D1 is set at a preset value Dpreset11, the value D2 is set at a preset value Dpreset11, and a value D3 is set at a preset value Dpreset13.

In the case where Vd2<Vd3<Vd2, the value D1 is set at a preset value Dpreset21, the value D2 is set at a preset value Dpreset22, and the value D3 is set at a preset value Dpreset23. In the case where Vd2<Vd3<Vd2, the value D1 is set at a preset value Dpreset31, the value D2 is set at a preset value Dpreset32, and the value D3 is set at a preset value Dpreset33.

In this way, a plurality of preset values can be set according to relationships between the rotation command voltages except for the monotonically increasing relationship (Vdn>...>Vd2>Vd1).

Figure 12:
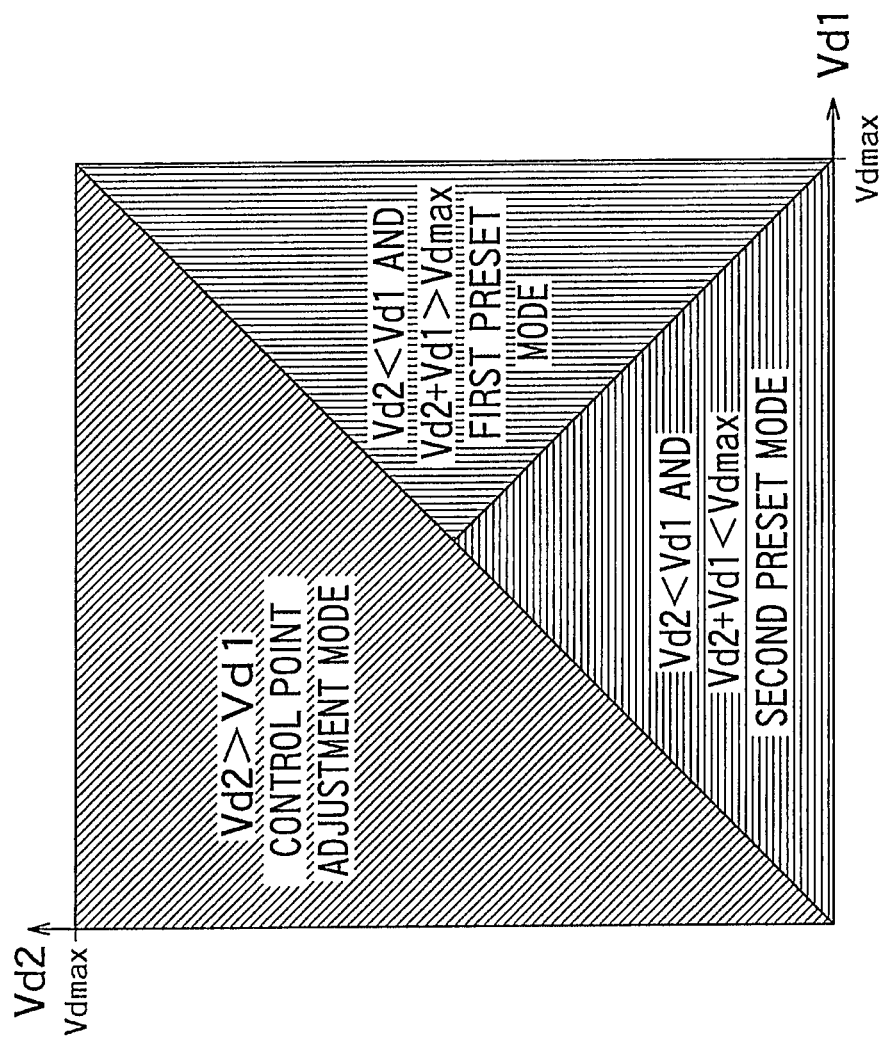
FIG. 12 is a graph showing another example of the relationship between the magnitude relationship between the voltages Vd1 and Vd2 and the operation mode of the duty calculating circuit.

FIG. 12 is a graph showing another example of the relationship between the magnitude relationship between the voltages Vd1 and Vd2 and the operation mode of the duty calculating circuit.

As shown in the example in FIG. 12, even when there are two control points, the region that satisfies the relationship Vd2<Vd1 can be further divided so that a plurality of preset values can be set.

For example, as shown in FIG. 12, in the case where Vd2<Vd1, and Vd1+Vd2>Vdmax, the duty calculating circuit A sets the value D1 at the preset value Dpreset11 and the value D2 at the preset value Dpreset12 (first preset mode).

That is, in the case where the voltage Vd2 of the second setting signal is equal to or lower than the voltage Vd2 of the first setting signal, and the sum of the voltage Vd2 of the second setting signal and the voltage Vd2 of the first setting signal is larger than a threshold (the upper limit value Vdmax, for example), the characteristics can be set to be previously stored first characteristics (first preset mode).

On the other hand, in the case where Vd2<Vd1, and Vd1+Vd2<Vdmax, the duty calculating circuit A sets the value D1 at the preset value Dpreset21 and the value D2 at the preset value Dpreset22 (second preset mode).

That is, in the case where the voltage Vd2 of the second setting signal is equal to or lower than the voltage Vd1 of the first setting signal, and the sum of the voltage Vd2 of the second setting signal and the voltage Vd1 of the first setting signal is smaller than a threshold (the upper limit value Vdmax, for example), the characteristics can be set to be previously stored second characteristics (second preset mode).

In the case where the voltage Vd2 of the second setting signal is higher than the voltage Vd1 of the first setting signal (Vd2>Vd1), the duty calculating circuit A updates the characteristics so that the characteristic line L passes through the first control point P1 and the second control point P2 as in the example shown in FIG. 9 (adjustment mode).

More preset values can also be set by combining the magnitude-based sorting and the region dividing described above.

The remainder of the function according to the second embodiment is the same as that according to the first embodiment.

That is, the motor driving circuit according to the second embodiment is improved in controllability of the number of revolutions of the motor as with the motor driving circuit according to the first embodiment.

Third Embodiment

In a third embodiment, an example of a time at which the duty calculating circuit A updates the characteristics will be described.

The motor driving system to which the third embodiment is applied is the same as the motor driving system 1000 according to the first embodiment. Therefore, the configuration thereof will be described with reference to the configuration according to the first embodiment shown in FIG. 5.

For example, during a period in which the motor driving waveform controlling circuit CON does not output the PWM signal, the duty calculating circuit A updates the characteristics as described above with regard to the first and second embodiments.

The period in which the motor driving waveform controlling circuit CON does not output the PWM signal is a certain period immediately after activation of an IC power supply or a period in which the first measuring circuit C1 measures the stop command voltage (the rotation command voltage equal to or lower than the minimum rotation command voltage VSPL), for example. During this period, the first and second setting signals are input to the second and third ports X2 and X3. Then, based on the voltages Vd1 and Vd2 measured by the second and third measuring circuits C2 and C3, the duty calculating circuit A updates the characteristics.

On the other hand, during a period in which the motor driving waveform controlling circuit CON outputs the PWM signal, the duty calculating circuit A does not update the characteristics.

The period in which the motor driving waveform controlling circuit CON outputs the PWM signal is a period in which the first measuring circuit C1 measures the rotation command voltage equal to or higher than the minimum rotation command voltage VSPL, for example.

The above-described operation of the duty calculating circuit A can prevent variations of the control points due to switching noise of the PWM output.

The configuration and function of the motor driving system according to the third embodiment are the same as those of the motor driving systems according to the first and second embodiments. That is, the motor driving system according to the third embodiment is improved in controllability of the number of revolutions of the motor as with the motor driving systems according to the first and second embodiments.

Fourth Embodiment

In the above embodiments, examples in which the characteristics are updated by varying the first and second control points P1 and P2 by adjusting the values D1 and D2 have been described.

The first and second control points P1 and P2 can be varied by adjusting the corresponding first and second rotation command voltages V1 and V2.

Thus, in a fourth embodiment, a case where the first and second rotation command voltages V1 and V2 that define the first and second control points are adjusted will be described.

Figure 13:
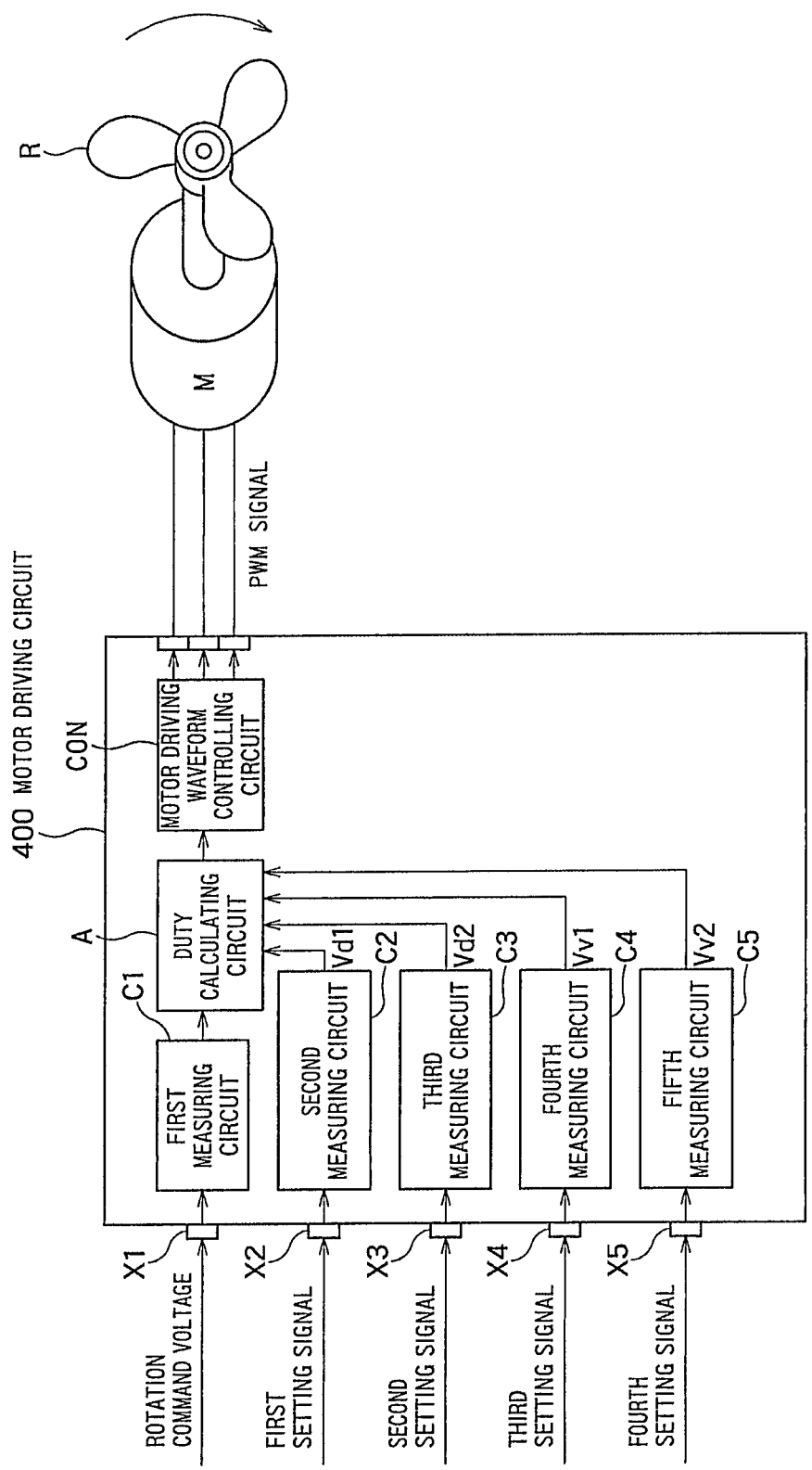
FIG. 13 is a diagram showing an example of a configuration of a motor driving system 4000 according to the fourth embodiment.
Figure 14:
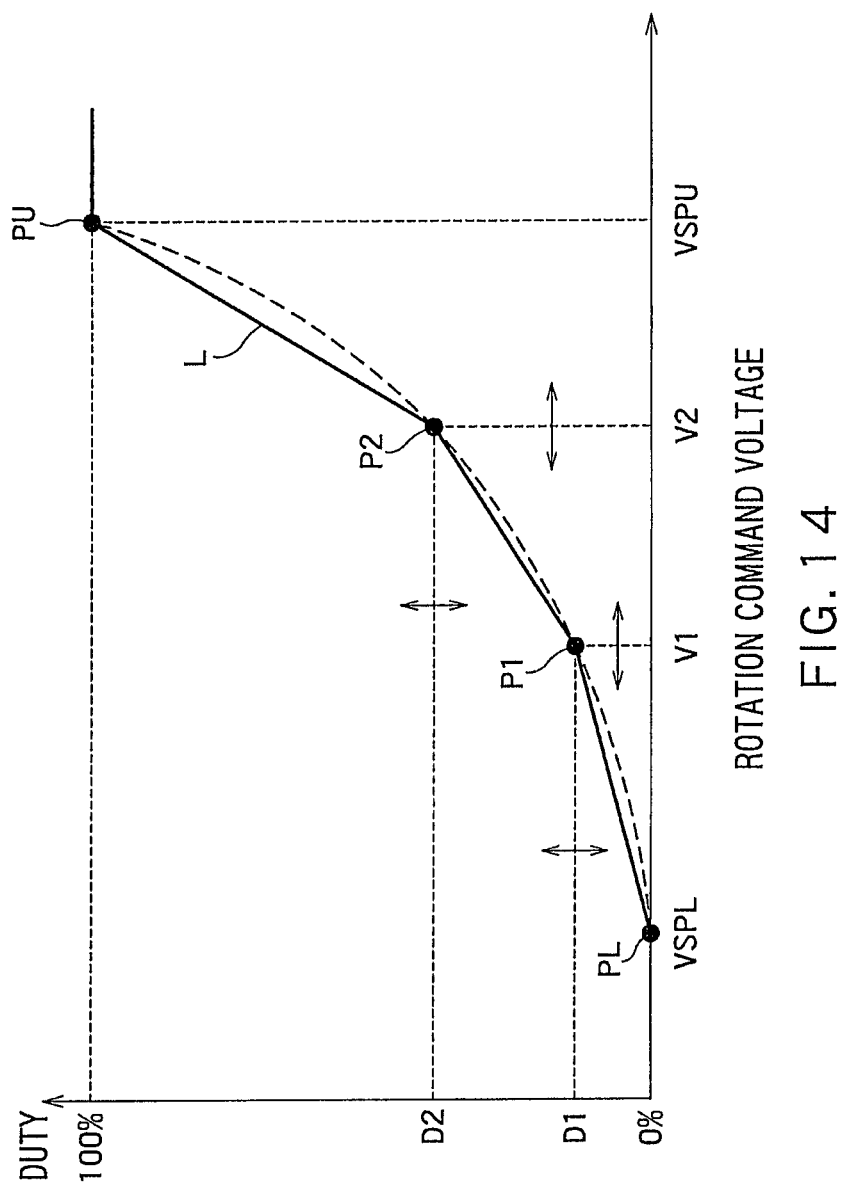
FIG. 14 is a graph showing characteristics of the relationship between the rotation command voltage and the duty according to the fourth embodiment defined by a characteristic line.

FIG. 13 is a diagram showing an example of a configuration of a motor driving system 4000 according to the fourth embodiment. FIG. 14 is a graph showing characteristics of the relationship between the rotation command voltage and the duty according to the fourth embodiment defined by a characteristic line. In FIGS. 13 and 14, the same reference numerals as those in FIGS. 5 and 6 denote the same components as those in the first embodiment.

As shown in FIG. 13, the motor driving system 4000 includes a motor driving circuit 400 and the motor M.

The motor driving system 400 differs from the motor driving circuit 100 according to the first embodiment in that the motor driving system 400 further has a fourth port X4, a fifth port X5, a fourth measuring circuit C4 and a fifth measuring circuit C5.

The fourth port X4 is configured to receive a third setting signal input from the MCU or the resistance voltage dividing circuit, for example.

The fifth port X5 is configured to receive a fourth setting signal input from the MCU or the resistance voltage dividing circuit, for example.

The fourth measuring circuit C4 is configured to measure the third setting signal input to the fourth port X4. Note that the third setting signal is an analog voltage (voltage Vv1) in this example.

The fifth measuring circuit C5 is configured to measure the fourth setting signal input to the fifth port X5. Note that the fourth setting signal is an analog voltage (voltage Vv2) in this example.

The duty calculating circuit A is configured to calculate the duty for the rotation command voltage measured by the first measuring circuit C1 based on the characteristics that defines the relationship between the rotation command voltage and the duty of the PWM signal (PWM on-duty), as in the first embodiment. The duty calculating circuit A is also configured to output a duty information signal corresponding to the calculated duty (PWM on-duty).

Next, an example of an operation of the motor driving circuit 400 having the configuration and function described above will be described.

First, the second to fifth measuring circuits C2 to C5 measure the first to fourth setting signals input to the second to fifth ports X2 to X5.

Then, information on the voltages Vd1, Vd2, Vv1 and Vv2 measured by the second to fifth measuring circuits C2 to C5 are transferred to the duty calculating circuit A.

The duty calculating circuit A calculates the duty D1 at the time when the rotation command voltage is V1 based on the voltage Vd1 (or determines the control point P1), and calculates the duty D2 at the time when the rotation command voltage is V2 based on the voltage Vd2 (or determines the control point P2), as in the first embodiment.

Alternatively, the duty calculating circuit A may be configured to calculate the first rotation command voltage V1 at the time when the duty is D1 based on the voltage Vv1 (or determines the control point P1) and calculate the second rotation command voltage V2 at the time when the duty is D2 based on the voltage Vv2 (or determines the control point P2).

In this way, the first and second rotation command voltages V1 and V2 may be set based on the third and fourth setting signals.

For example, according to the following relations (3) and (4), the first and second rotation command voltages V1 and V2 are calculated from the voltages Vv1 and Vv2. In the relations (3) and (4), $\alpha v$ denotes a factor of proportionality, and $\beta v$ denotes an offset. $\alpha v$ and $\beta v$ are selected so that the first and second rotation command voltages V1 and V2 are the maximum rotation command voltage VSPU when the voltages Vv1 and Vv2 are the upper limit value Vdmax, and are the minimum rotation command voltage VSPL when the voltages Vv1 and Vv2 are the lower limit value Vdmin.

$$V1 = \alpha v * Vv1 + \beta v \quad (3)$$

$$V2 = \alpha v * Vv2 + \beta v \quad (4)$$

The duty calculating circuit A performs interpolation between the lowest point PL, the first control point P1, the second control point P2 and the highest point PU. For example, the duty calculating circuit A performs linear interpolation or curve interpolation including Lagrange interpolation, spline interpolation or Bezier interpolation so that the characteristic line L passes through the lowest point PL, the first control point P1, the second control point P2 and the highest point PU.

In this way, the duty calculating circuit A updates the characteristics so that the characteristic line L passes through the first control point P1 and the second control point P2.

As described above, a user can update the characteristics that defines the relationship between the rotation command voltage and the duty of the PWM signal (PWM on-duty) by adjusting the first and second control points P1 and P2 with the first and second setting signals so that the relationship between the rotation command voltage and the number of revolutions is linear as shown in FIG. 4 described above.

The remainder of the configuration is the same as that in the first embodiment.

As described above, the motor driving system 4000 according to the fourth embodiment is improved in controllability of the number of revolutions of the motor.

Fifth Embodiment

In a fifth embodiment, an example in which the characteristics is updated by varying two or more control points with a single setting signal will be described.

The motor driving system to which the fifth embodiment is applied is the same as the motor driving system 1000 according to the first embodiment. Therefore, the configuration thereof will be described with reference to the configuration according to the first embodiment shown in FIG. 5.

Figure 15:
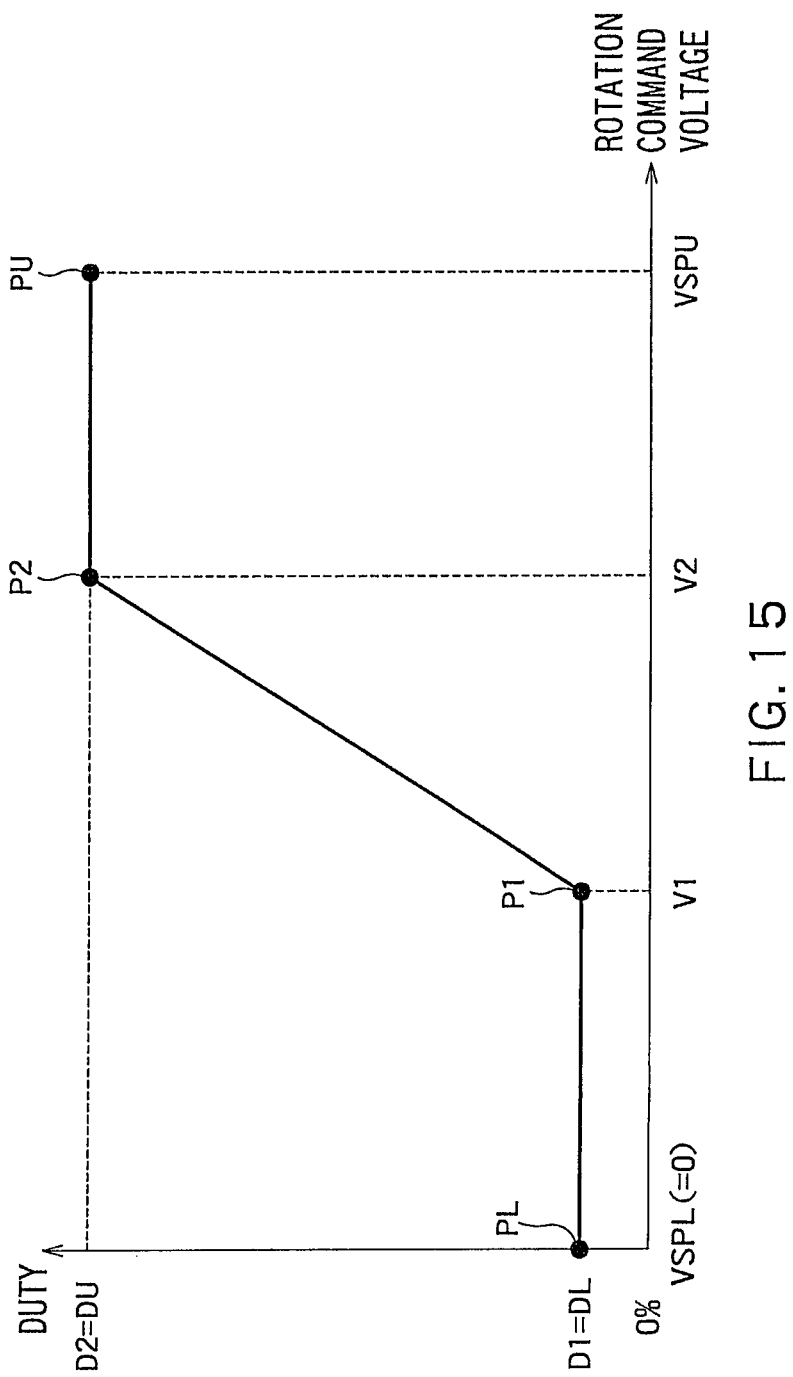
FIG. 15 is a graph showing characteristics according to the fifth embodiment defined by a characteristic line showing a relationship between the rotation command voltage and the duty.

FIG. 15 is a graph showing characteristics according to the fifth embodiment defined by a characteristic line showing a relationship between the rotation command voltage and the duty. In this example, it is assumed that the rotation command voltage VSPL is 0 V, and the control point PL lies at the rotation command voltage VSPL. The duty at the control point PL is denoted by DL.

For example, on the assumption that the duty values at the control points P1 and PL are equal to each other, the duty calculating circuit A updates the duty values at the control points P1 and PL according to the following relation (5) using the value Vd1 measured by the first measuring circuit C1.

$$DL = D1 = \alpha * Vd1 + \beta \quad (5)$$

In this way, a plurality of points can be controlled with a reduced number of ports. In addition, regardless of the rotation command voltage, the minimum number of revolutions can be defined by varying the duty at VSPL. A similar variation in which the maximum number of revolutions is defined is also possible. That is, it is assumed that the maximum value of the rotation command voltage is VSPU, and the control point PU lies at the rotation command voltage VSPU. The duty at the control point PU is denoted by DU.

For example, on the assumption that the duty values at the control points P2 and PU are equal to each other, the duty calculating circuit A updates the duty values at the control points P2 and PU according to the following relation (6) using the value Vd2 measured by the first measuring circuit $$DU = D2 = \alpha * Vd2 + \beta \quad (6)$$

In this way, a plurality of points can be controlled with a reduced number of ports. In addition, regardless of the rotation command voltage, the maximum number of revolutions can be defined by varying the duty at VSPU.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A motor driving circuit that controls driving of a motor with a PWM signal so that the motor rotates at a number of revolutions specified by a rotation command signal, comprising:
a first port to which the rotation command signal that defines the number of revolutions of the motor is input;
a first measuring circuit that measures the rotation command signal;
a second port to which a first setting signal is input;
a second measuring circuit that measures the first setting signal;
a duty calculating circuit that calculates a duty corresponding to the measured rotation command signal based on a characteristic that defines a relationship between the rotation command signal and a duty of the PWM signal, and outputs a duty information signal corresponding to the calculated duty;
a motor driving waveform controlling circuit that generates and outputs the PWM signal having the calculated duty based on the duty information signal;
a third port to which a second setting signal is input; and
a third measuring circuit that measures the second setting signal,
wherein the characteristic is defined by a characteristic line that connects a lowest point at which the duty of the PWM signal is a minimum value and the rotation command signal is a minimum rotation command signal, and a highest point at which the duty of the PWM signal is a maximum value and the rotation command signal is a maximum rotation command signal, and
the duty calculating circuit
updates the characteristic so that the characteristic line passes through a first control point at which the duty of the PWM signal is a value set based on the first setting signal and the rotation command signal is a first rotation command signal between the minimum rotation command signal and the maximum rotation command signal, and
wherein the duty calculating circuit
updates the characteristic so that the characteristic line passes through the first control point and a second control point at which the duty of the PWM signal is a value set based on the second setting signal and the rotation command signal is a second rotation command signal between the minimum rotation command signal and the maximum rotation command signal.

2. The motor driving circuit according to claim 1, wherein the duty calculating circuit
performs linear interpolation or curve interpolation including Lagrange interpolation, spline interpolation or Bezier interpolation so that the characteristic line passes through the lowest point, the first control point and the highest point.

3. The motor driving circuit according to claim 1, wherein the second rotation command signal is higher than the first rotation command signal.

4. The motor driving circuit according to claim 1, wherein the characteristic line is a monotonically increasing function that defines the relationship between the rotation command voltage and the duty of the PWM signal.

5. The motor driving circuit according to claim 1, wherein the maximum value of the duty of the PWM signal is 100% and the minimum value of the duty of the PWM signal is 0%.

6. The motor driving circuit according to claim 1, wherein the duty calculating circuit does not update the characteristics during a period in which the motor driving waveform controlling circuit outputs the PWM signal.

7. The motor driving circuit according to claim 1, wherein the duty calculating circuit updates the characteristics during a period in which the motor driving waveform controlling circuit does not output the PWM signal.

8. The motor driving circuit according to claim 1, wherein the first setting signal is an analog voltage.

9. The motor driving circuit according to claim 1, wherein the duty calculating circuit
updates the characteristic so that the characteristic line passes through the first control point and the second control point in a case where a voltage of the second setting signal is higher than a voltage of the first setting signal, and
sets the characteristic to be a previously stored characteristic in a case where the voltage of the second setting signal is equal to or lower than the voltage of the first setting signal.

10. The motor driving circuit according to claim 1, further comprising:
a fourth port to which a third setting signal is input; and
a fourth measuring circuit that measures the third setting signal,
wherein the first rotation command signal is set based on the third setting signal.

11. The motor driving circuit according to claim 1, wherein the duty calculating circuit updates two or more duties of the first control point, the second control point, the lowest point and the highest point based on the first setting signal.

12. The motor driving circuit according to claim 9, wherein the duty calculating circuit
sets the characteristic to be a previously stored first characteristic in a case where the voltage of the second setting signal is lower than the voltage of the first setting signal, and the sum of the voltage of the second setting signal and the voltage of the first setting signal is larger than a threshold, and
sets the characteristic to be a previously stored second characteristic that differs from the first characteristic in a case where the voltage of the second setting signal is lower than the voltage of the first setting signal, and the sum is equal to or smaller than the threshold.

13. A motor driving system, comprising:
a motor; and
a motor driving circuit that controls driving of the motor with a PWM signal so that the motor rotates at a number of revolutions specified by a rotation command signal,
wherein the motor driving circuit comprising:
a first port to which the rotation command signal that defines the number of revolutions of the motor is input;
a first measuring circuit that measures the rotation command signal;
a second port to which a first setting signal is input;
a second measuring circuit that measures the first setting signal;
a duty calculating circuit that calculates a duty corresponding to the measured rotation command signal based on a characteristic that defines a relationship between the rotation command signal and a duty of the PWM signal, and outputs a duty information signal corresponding to the calculated duty;
a motor driving waveform controlling circuit that generates and outputs the PWM signal having the calculated duty based on the duty information signal;
a third port to which a second setting signal is input; and
a third measuring circuit that measures the second setting signal,
wherein the characteristic is defined by a characteristic line that connects a lowest point at which the duty of the PWM signal is a minimum value and the rotation command signal is a minimum rotation command signal, and a highest point at which the duty of the PWM signal is a maximum value and the rotation command signal is a maximum rotation command signal, and
the duty calculating circuit
updates the characteristic so that the characteristic line passes through a first control point at which the duty of the PWM signal is a value set based on the first setting signal and the rotation command signal is a first rotation command signal between the minimum rotation command signal and the maximum rotation command signal, and
wherein the duty calculating circuit
updates the characteristic so that the characteristic line passes through the first control point and a second control point at which the duty of the PWM signal is a value set based on the second setting signal and the rotation command signal is a second rotation command signal between the minimum rotation command signal and the maximum rotation command signal.

14. The motor driving system according to claim 13, wherein the duty calculating circuit
performs linear interpolation or curve interpolation including Lagrange interpolation, spline interpolation or Bezier interpolation so that the characteristic line passes through the lowest point, the first control point and the highest point.

15. The motor driving system according to claim 13, wherein the second rotation command signal is higher than the first rotation command signal.

16. The motor driving system according to claim 13, wherein the characteristic line is a monotonically increasing function that defines the relationship between the rotation command voltage and the duty of the PWM signal.

17. The motor driving system according to claim 13, wherein the maximum value of the duty of the PWM signal is 100% and the minimum value of the duty of the PWM signal is 0%.

18. A motor driving circuit that controls driving of a motor with a PWM signal so that the motor rotates at a number of revolutions specified by a rotation command signal, comprising:
a first port to which the rotation command signal that defines the number of revolutions of the motor is input;

a first measuring circuit that measures the rotation command signal;
a second port to which a first setting signal is input;
a second measuring circuit that measures the first setting signal;
a duty calculating circuit that calculates a duty corresponding to the measured rotation command signal based on a characteristic that defines a relationship between the rotation command signal and a duty of the PWM signal, and outputs a duty information signal corresponding to the calculated duty; and
a motor driving waveform controlling circuit that generates and outputs the PWM signal having the calculated duty based on the duty information signal,
wherein the characteristic is defined by a characteristic line that connects a lowest point at which the duty of the PWM signal is a minimum value and the rotation command signal is a minimum rotation command signal, and a highest point at which the duty of the PWM signal is a maximum value and the rotation command signal is a maximum rotation command signal, and
the duty calculating circuit
updates the characteristic so that the characteristic line passes through a first control point at which the duty of the PWM signal is a value set based on the first setting signal and the rotation command signal is a first rotation command signal between the minimum rotation command signal and the maximum rotation command signal, and
wherein the duty calculating circuit updates the characteristics during a period in which the motor driving waveform controlling circuit does not output the PWM signal.

* * * * *